US007806326B2

(12) United States Patent
Lanigan et al.

(10) Patent No.: US 7,806,326 B2
(45) Date of Patent: Oct. 5, 2010

(54) DOOR MANAGEMENT SYSTEM FOR FIELD SERVICE AND DELIVERY PERSONNEL

(76) Inventors: William P. Lanigan, 10738 Eagle Ridge Dr., Orland Park, IL (US) 60467; John J. Wepfer, 12246 W. Derby La., Orland Park, IL (US) 60467; Maciej Labowicz, 785 Larson La., Roselle, IL (US) 60172; Gary A. Naese, 425 E. Smith Ave., Bonfield, IL (US) 60913; Gerald F. Chalko, Jr., 2306 Martha St., Unit 102, Highland, IN (US) 46322

( * ) Notice: Subject to any disclaimer, the term of this patent is extended or adjusted under 35 U.S.C. 154(b) by 1017 days.

(21) Appl. No.: 11/580,317

(22) Filed: Oct. 4, 2006

(65) Prior Publication Data

US 2008/0142587 A1 Jun. 19, 2008

(51) Int. Cl.
*G06K 5/00* (2006.01)
*G06F 17/00* (2006.01)

(52) U.S. Cl. ...................................... 235/382; 235/375

(58) Field of Classification Search ................. 235/375, 235/382

See application file for complete search history.

(56) References Cited

U.S. PATENT DOCUMENTS 5,050,346 A * 9/1991 Eccleston .................... 49/280
6,422,463 B1 * 7/2002 Flink .......................... 235/382

OTHER PUBLICATIONS www.power-access.com Power Access Automatic Door Opener, Date unknown, 14 pages.
Power Access Corp., Model 4300, Technical Information, Date: Mar. 1, 2001, 22 pages.
Swing Door Operator, Dorma ED 200, Date: Apr. 1999, 20 pages.
Swing Door Operator, Dorma ED 200, Date Unknown, 31 pages.
Installation Instructions, Dorma ED800 Series, Date: Feb. 2004, 28 pages.
Dorma ED 800 Series Service Manual, Date : Mar. 1995, 14 pages.

* cited by examiner

*Primary Examiner*—Jamara A Franklin

(57) ABSTRACT

A delivery system, comprising the steps of: assigning field personnel to provide a delivery or service at a designated location; traveling to the designated location to provide an on-site delivery or service; remotely actuating an opening mechanism to open an emergency exit door; entering the designated location through the door opening; providing a delivery or service at the designated location; and closing the emergency exit door after the delivery or service has been substantially completed.

21 Claims, 17 Drawing Sheets

Providing delivery/service through emergency exit door

Providing delivery/service through emergency exit door

EMERGENCY EXIT DOOR (100)
INTERIOR VIEW

EMERGENCY EXIT DOOR (100)
EXTERIOR VIEW

DOOR OPENER AND CLOSURE

ELECTRIC DOOR STRIKE
WITH DOOR MAGNETS

DOOR CLOSED

VIEW A-A (TOP COVER REMOVED)

DOOR PARTIALLY OPENED

VIEW A-A (TOP COVER REMOVED)

DOOR FULLY OPENED

VIEW A-A (TOP COVER REMOVED)

EMERGENCY EXIT UNAFFECTED

VIEW A-A (TOP COVER REMOVED)

DOOR PARTIALLY OPEN

VIEW A-A (TOP COVER REMOVED)

DOOR PARTIALLY CLOSED

VIEW A-A (TOP COVER REMOVED)

DOOR CLOSED

VIEW A-A (TOP COVER REMOVED)

DOOR CLOSED

VIEW A-A (TOP COVER REMOVED)

DOOR PARTIALLY OPENED

VIEW A-A (TOP COVER REMOVED)

DOOR OPENED

VIEW A-A (TOP COVER REMOVED)

VIEW A-A

FEATURING LARGE OPENING ANGLES

DOOR MANAGEMENT SYSTEM FOR FIELD SERVICE AND DELIVERY PERSONNEL

CROSS REFERENCE TO RELATED APPLICATIONS

This Application is related to Applicant's Application entitled Door Management System for Field Service and Delivery Personnel, having U.S. Ser. No. 11/601,857, and filing date of Nov. 17, 2006.

BACKGROUND

This invention relates to a system and apparatus for use in connection with field and/or delivery personnel, to enable such workers to work more efficiently.

A need exists for field and delivery workers to work more efficiently. For example, field workers and delivery personnel are often required to do the following: 1. Drive to an establishment, such as a store, restaurant, or a fast food restaurant, and park a delivery vehicle near a delivery/emergency exit door. 2. Exit the vehicle and walk to the front door. 3. Unlock the front door with a mechanical key and enter the store. 4. Re-lock the front door from inside. 5. Proceed to the security alarm system and disarm it within an allotted time. 6. Turn on lights and walk to back of the store to the delivery entrance. 7. Open the delivery/emergency exit door and block it open with any available equipment (e.g. a fire extinguisher). 8. Load merchandise from the truck on a cart or hand dolly. 9. Deliver merchandise though the opened/blocked door. 10. Repeat steps 8 and 9 until the delivery is complete while the door is blocked open. 11. When the delivery is complete, unblock the delivery/emergency exit door and close it from the inside. 12. Turn the alarm system back on and turn the lights off. 13. Unlock the front door, exit the store, and relock it with the mechanical key. 14. Return to the delivery vehicle near the delivery/emergency exit door to proceed to next delivery stop.

A solution to this cumbersome process is provided by this invention. A more detailed explanation of the invention is provided in the following description and claims, and is illustrated in the accompanying drawings.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
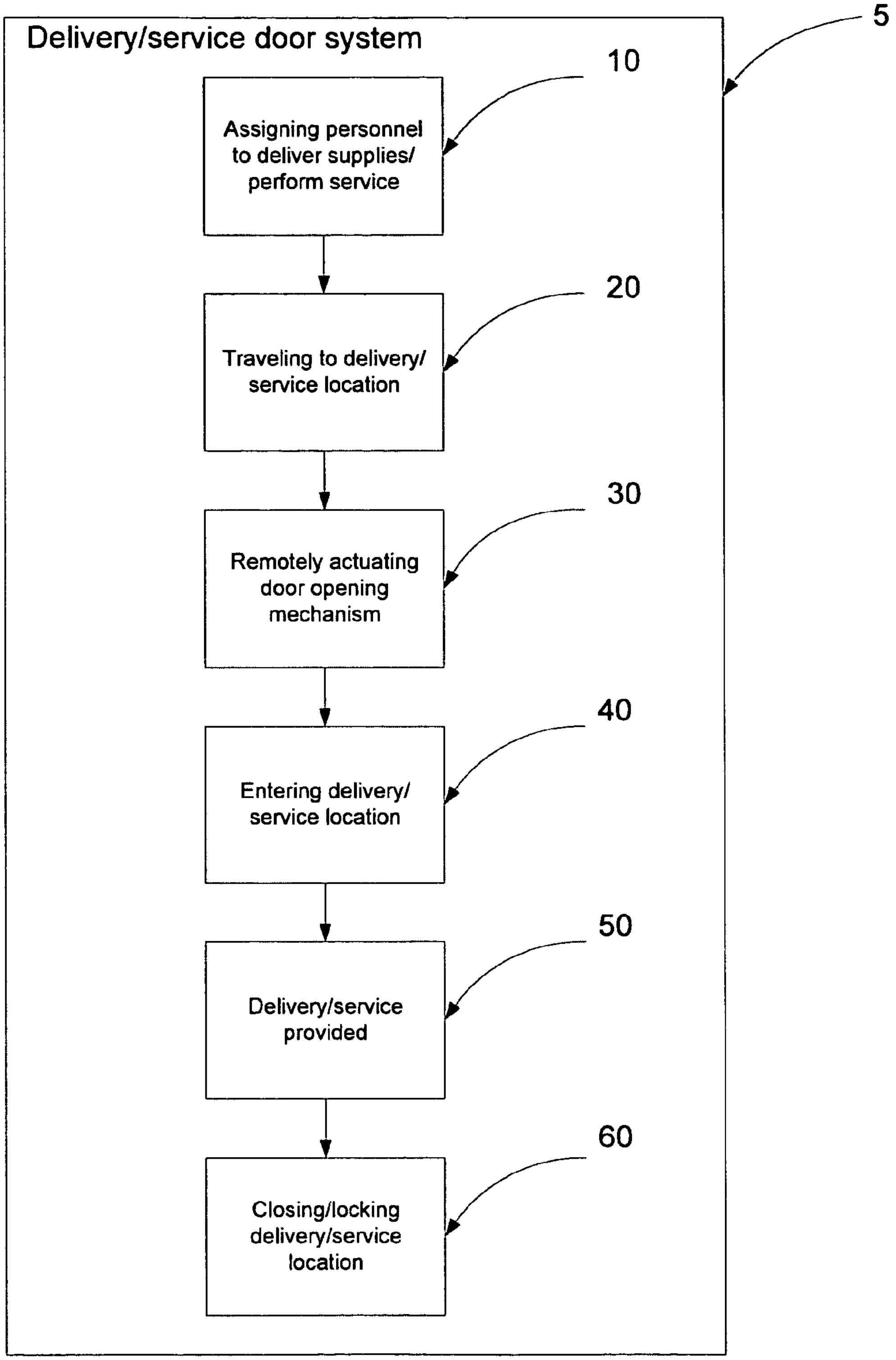
FIG. 1 is a flow diagram of the delivery system for field and delivery workers, in accordance with the instant invention.

Turning now to the drawings, and more particularly to FIG. 1 thereof, a block diagram of a delivery system 5 is shown. In its simplest form, it includes the steps of: assigning field personnel to enable them to provide a delivery or service at a designated location 10 (hereafter assigning step 10); traveling to the designated location to provide an on-site delivery or service 20 (hereafter traveling step 20); remotely actuating an opening mechanism to open an emergency exit door 30 (hereafter actuating step 30); entering the designated location through the emergency exit door opening 40 (hereafter entering step 40); providing a delivery or service at the designated location 50 (hereafter providing step 50); and closing and locking the emergency exit door after the delivery or service has been substantially completed 60 (hereafter closing step 60). The delivery system disclosed here, is a more efficient and cost effective method then those presently known.

In more detail, the actuating step 30 includes an applying step, to provide a sufficient threshold force in a substantially outwardly direction and substantially perpendicular direction to the emergency exit door, to open the door. This step provides a simple and durable method and means of opening an emergency exit door.

Figure 6:
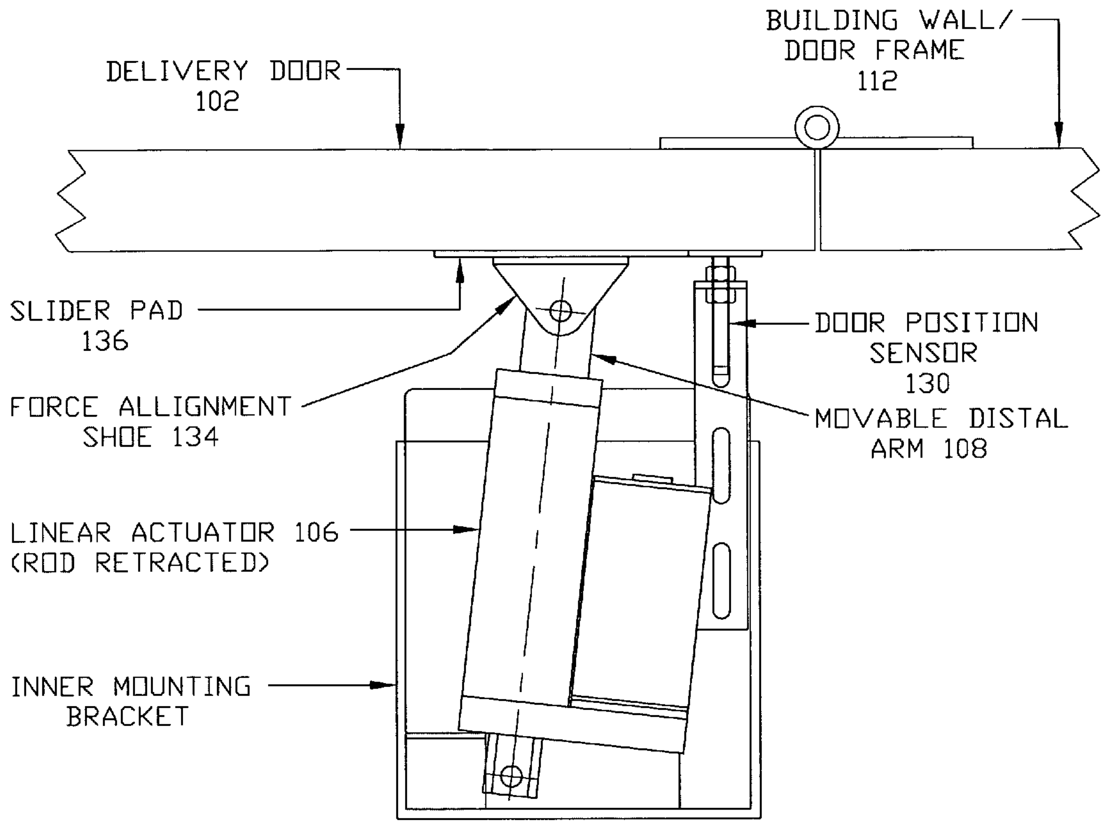
FIG. 6 includes an A-A view of an embodiment as depicted in FIG. 4, with a preferred actuator when the door is in a closed position, in accordance with the instant invention.
Figure 7:
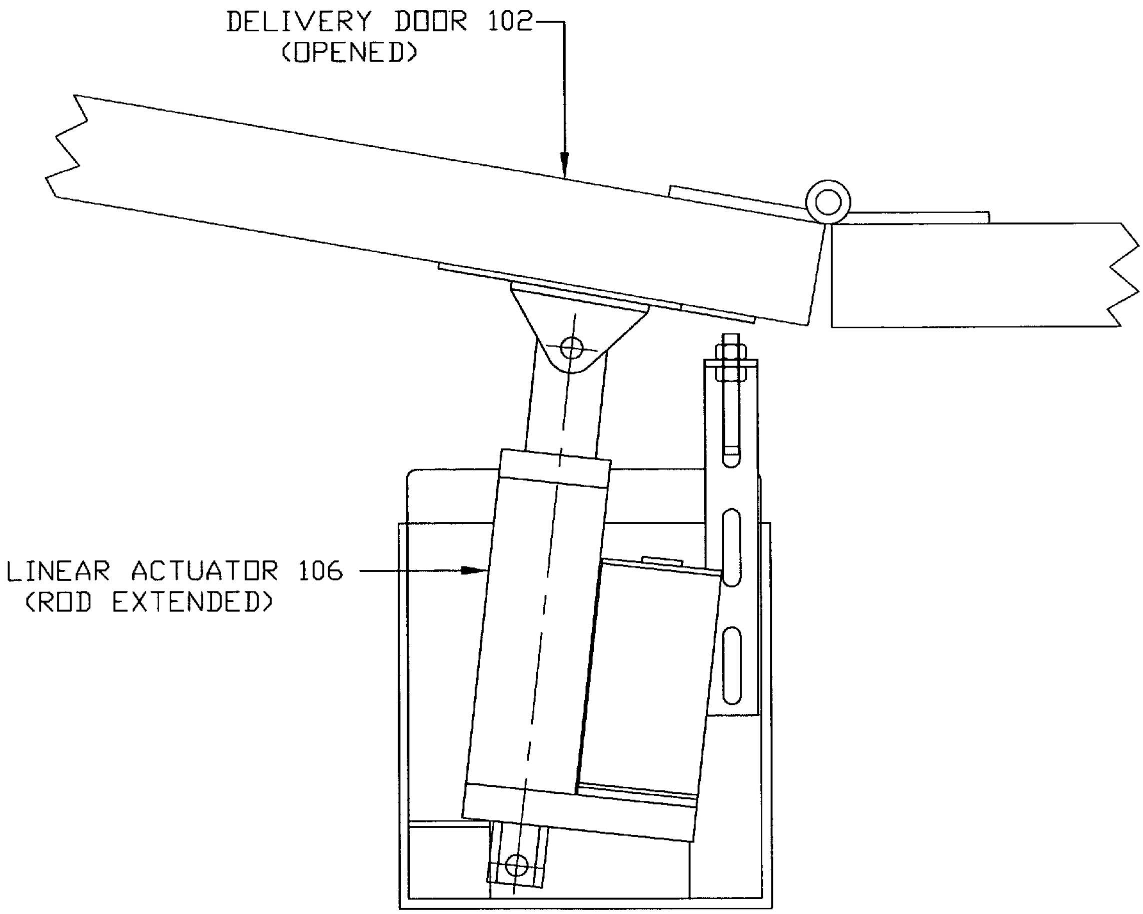
FIG. 7 includes an A-A view of an embodiment as depicted in FIG. 6, with a preferred actuator when the door is in a partially opened position, in accordance with the instant invention.

In a preferred embodiment, the applying step includes application of a sufficient threshold force step, such as providing a force of at least about 20 lbs., depending on the position of such force, for a smooth and sufficient opening force, as shown in FIGS. 6 and 7. In a preferred embodiment, the applying step includes providing a force of at least 25 lbs. to about 300 lbs. or more, when applied in proximity to a hinge, for an efficient and sufficient opening force.

Figure 13:
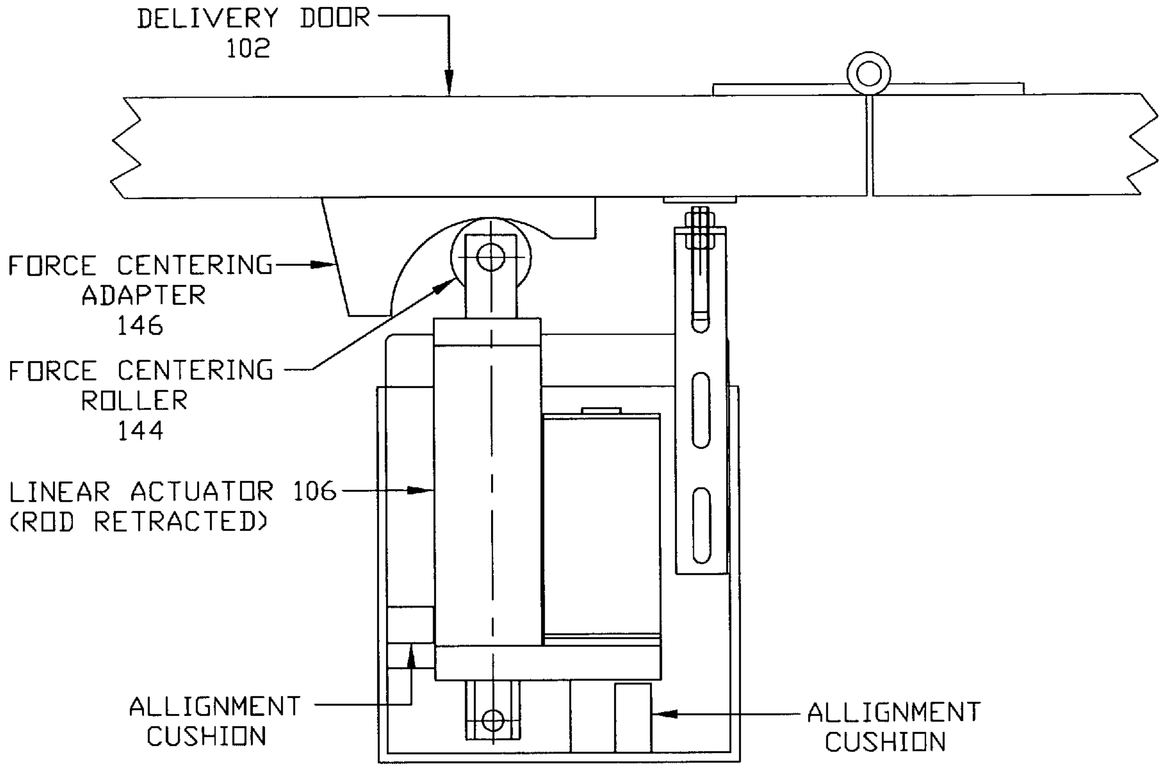
FIG. 13 includes an A-A view of an embodiment as depicted in FIG. 4, with a preferred actuator having a force centering roller and force centering adapter or interface, when the door is in a closed position, in accordance with the instant invention.
Figure 14:
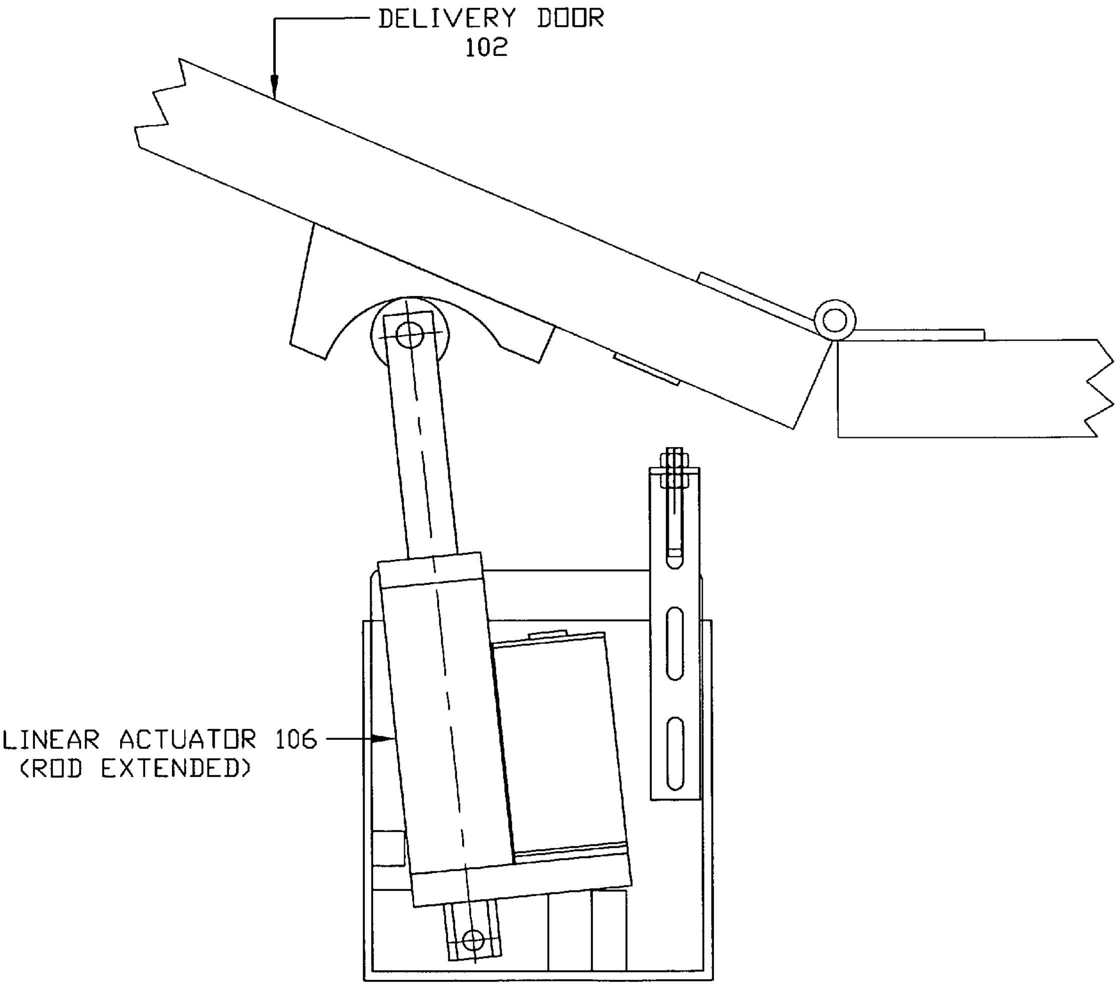
FIG. 14 includes an A-A view of an embodiment as depicted in FIG. 13, with a preferred actuator having a force centering roller and force centering adapter or interface, when the door is in a partially opened position and the actuator is still shown in contact with the door through the adapter, in accordance with the instant invention.
Figure 15:
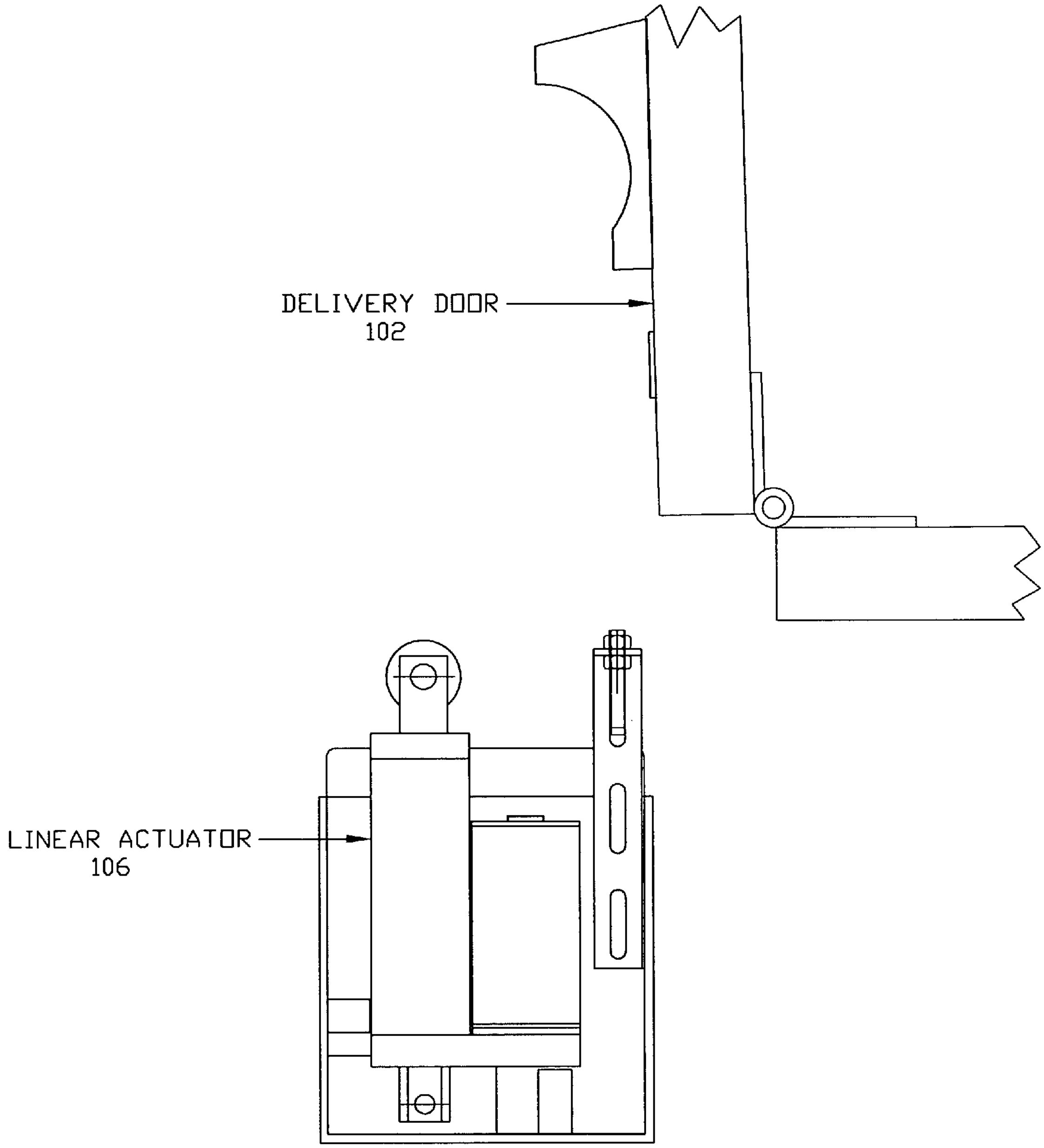
FIG. 15 includes an A-A view of an embodiment as depicted in FIG. 13, with a preferred actuator having a force centering roller and force centering adapter or interface, when the door is in a fully opened position, and the actuator is substantially not shown in contact with the door through the adapter, in accordance with the instant invention.
Figure 16:
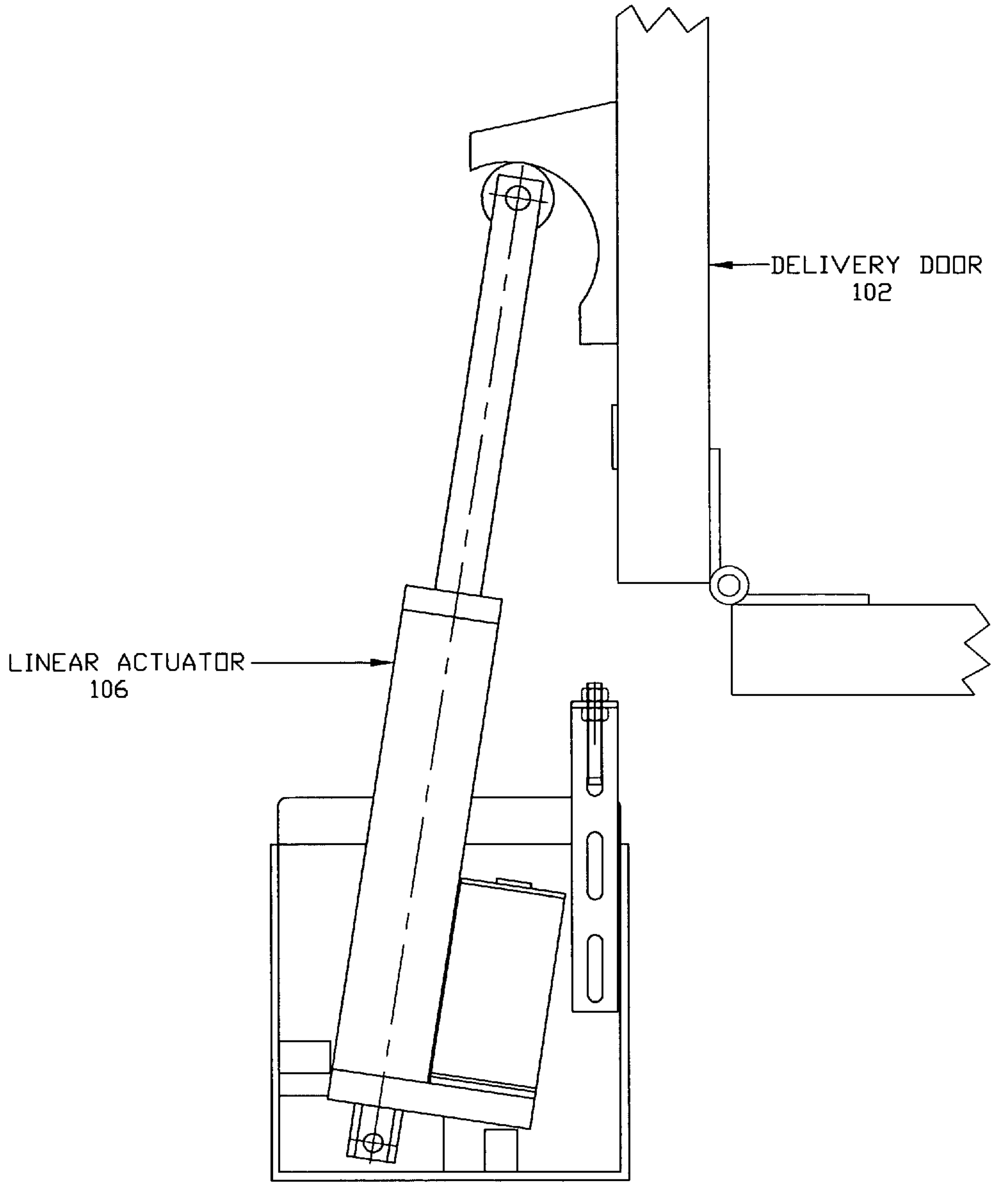
FIG. 16 includes an A-A view of an embodiment as depicted in FIG. 13, with a preferred actuator having a force centering roller and force centering adapter or interface, when the door is in a fully opened position, and the actuator in this embodiment is shown extended and in contact with the door through the adapter, in accordance with the instant invention.

In more detail, the remotely actuating step 30 can include the steps of: applying a sufficient threshold force in a substantially outwardly direction and substantially perpendicular direction to the emergency exit door; providing the threshold force in the substantially perpendicular direction ranging from zero degrees to about 30 degrees from the perpendicular direction of the emergency exit door; and minimizing a side load to an actuator, as shown in FIGS. 13, 14 and 16. This combination of steps, provides a smooth and efficient opening and can contribute to providing a longer useful life of the delivery system 5 and associated apparatus utilized herein.

In a preferred embodiment, providing the threshold force in the substantially perpendicular direction ranging from about zero degrees to about 20 degrees from the perpendicular direction, advantageously helps to minimize a disadvantageous side load to the actuator, relative to the actuating step 30. In such an embodiment, the side load is minimal or near zero at half stroke, which is beneficial to maximizing the useful life of the system and actuating step 30. Side loads or radial loads can reduce the life of actuator.

Figure 2:
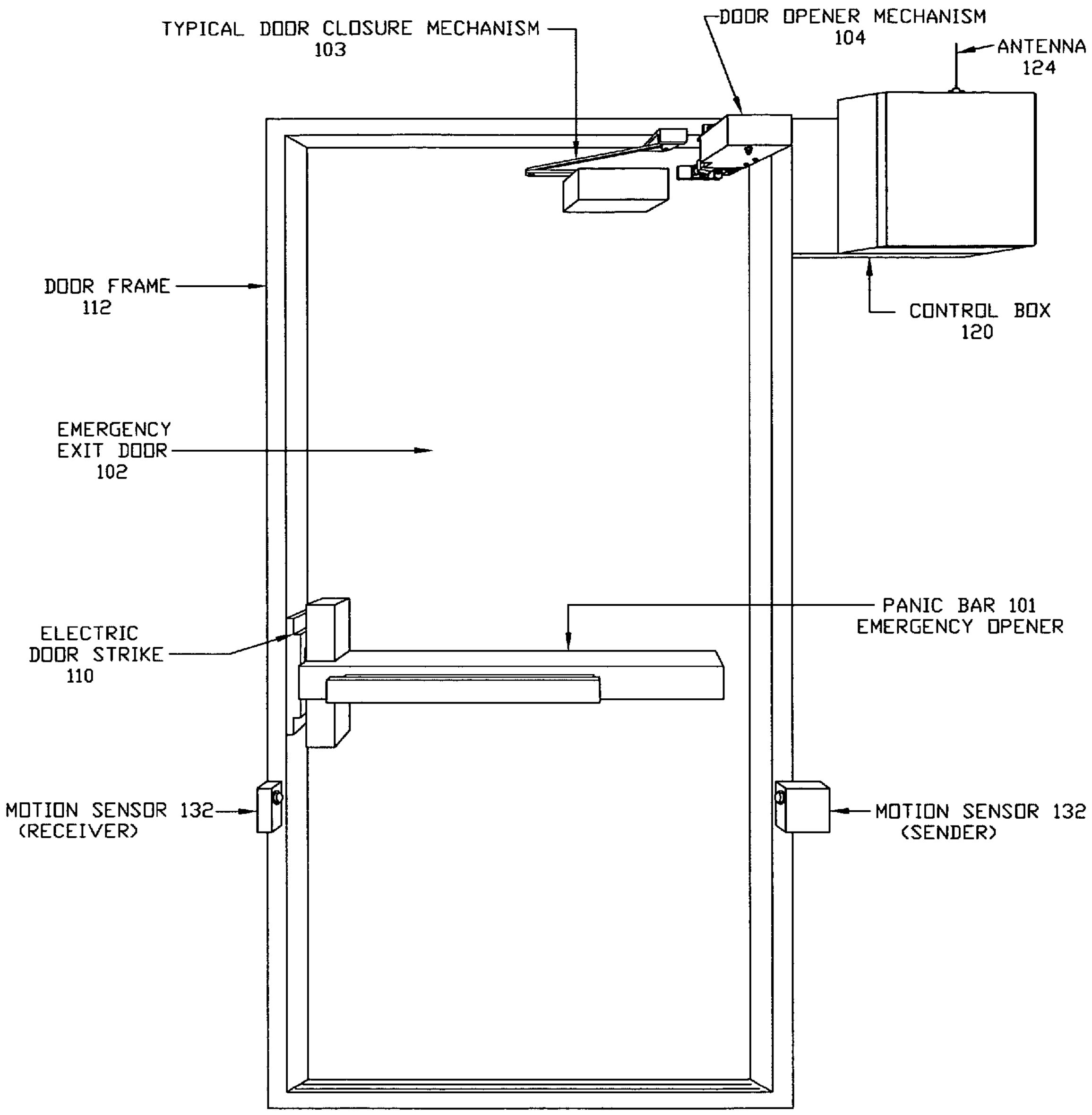
FIG. 2 is an interior view of an emergency exit door with associated structure, such as a control box, door opener, electric door strike and motion sensors, in accordance with the instant invention.

Also in a preferred embodiment, the actuating step 30 includes locating the outwardly pushing force at a location and position which is substantially minimally invasive to the emergency exit door opening, to allow free and unobstructed access through such door, as illustrated in FIG. 2. The locating step can include positioning the pushing force in proximity to an upper corner of the emergency exit door near a side of the door where hinges are normally located for free access through the door.

Figure 8:
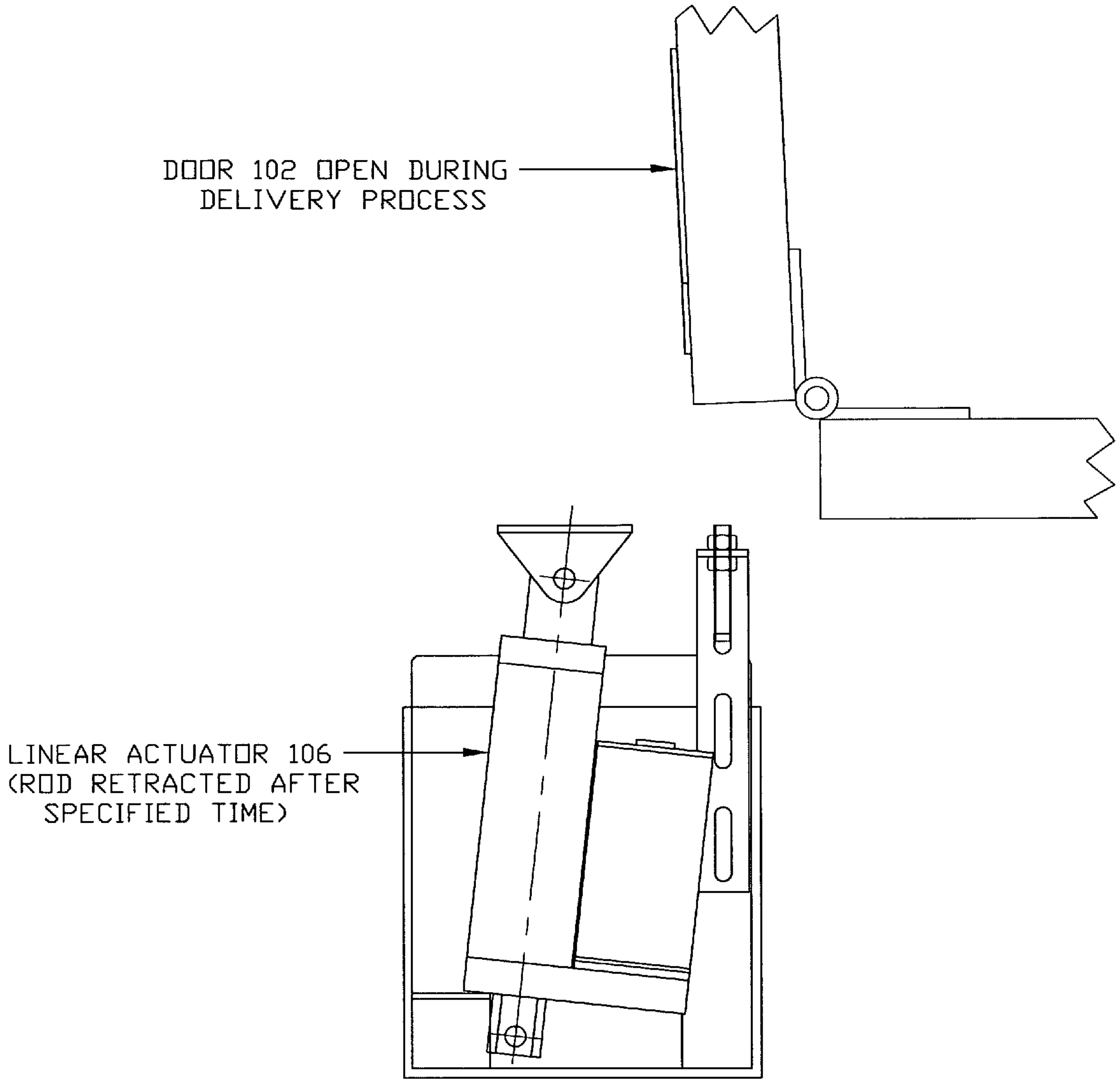
FIG. 8 includes an A-A view of an embodiment as depicted in FIG. 6, with a preferred actuator when the door is in a fully opened position, in accordance with the instant invention.

In one embodiment, the actuating step includes: applying a sufficient threshold force in an outwardly direction and in a substantially perpendicular direction to the emergency exit door (FIG. 6); energizing an electric strike to unlock the door (FIG. 5), and providing an opening mechanism which is substantially free of being mechanically connected to the emergency exit door (FIG. 8). It is important not to hinder or obstruct the emergency exit and not alter the main function of door, which is for emergency exiting. Further, the providing step which is substantially free of being mechanically connected to the door, allows a field worker to push and swing the door fully open, to keep such door out of the way during field work or emergency exit, for example (FIG. 8).

In more detail, the providing step 30 can include: providing a plunging mechanism to contact the emergency exit door to push in a substantially outwardly direction; and providing a receiving interface for contacting the plunging mechanism, operatively connected to an inside of the emergency exit door (FIG. 6). Preferably, a minimal friction pad or interface, such as a Teflon-like pad is provided for protection to the door and reduces friction for pushing and sliding, for smooth and a substantially non-binding opening movement.

In a preferred embodiment, the interface includes a substantially concave cup complementarily constructed to receive a portion of a roller of the actuator (FIGS. 13-16). This construction can substantially eliminate a side load to the actuator, for enhanced useful life to the actuator, while maintaining detachability as well, as detailed herein.

Figure 3:
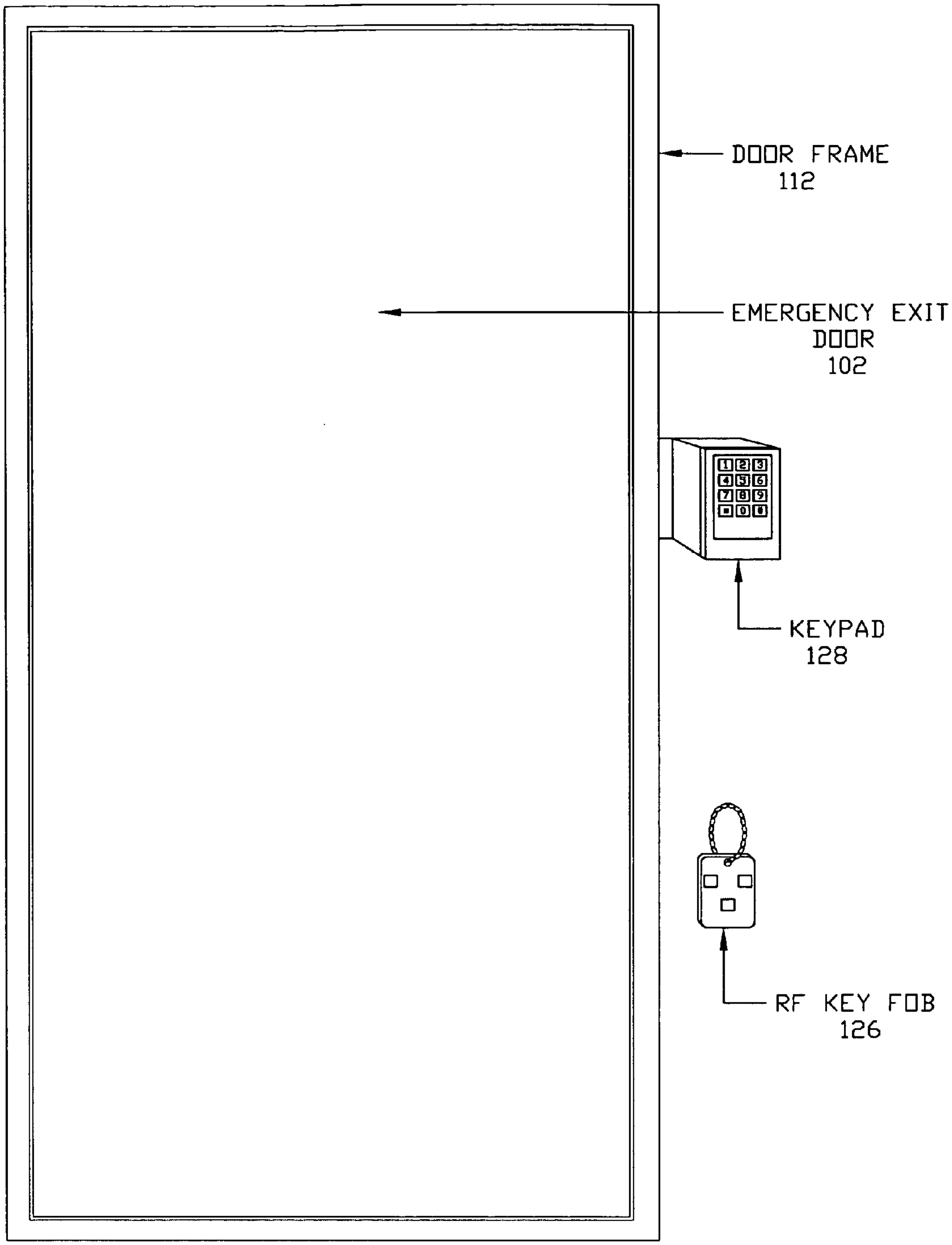
FIG. 3 is an exterior view of an emergency exit door with associated structure, such as a keypad and a typical RF (radio frequency) key fob in accordance with the instant invention.

In one embodiment, the actuating step 30 includes a wired device, such as a keypad or a wireless device, such as an RF key fob, etc. for actuation, for example (FIG. 3). As will be appreciated by those skilled in the art, various types of RF communication devices can be used as means for wireless communication. In a preferred embodiment, the actuating step 30 includes providing an RF key fob with at least one of an open signal, an alarm disable signal, a re-activate alarm signal and a panic signal.

In a preferred embodiment, the actuating step 30 further includes activating the electric door strike mechanism to release a pivoting structure of the door strike mechanism, to allow the door to open (FIG. 5); and pushing the door in an outwardly direction thereafter (FIG. 6). This is necessary, as it should be noted, that the door herein is typically an emergency exit door, that typically cannot be opened from the outside, without first activating the door strike mechanism before opening such door.

Figure 5:
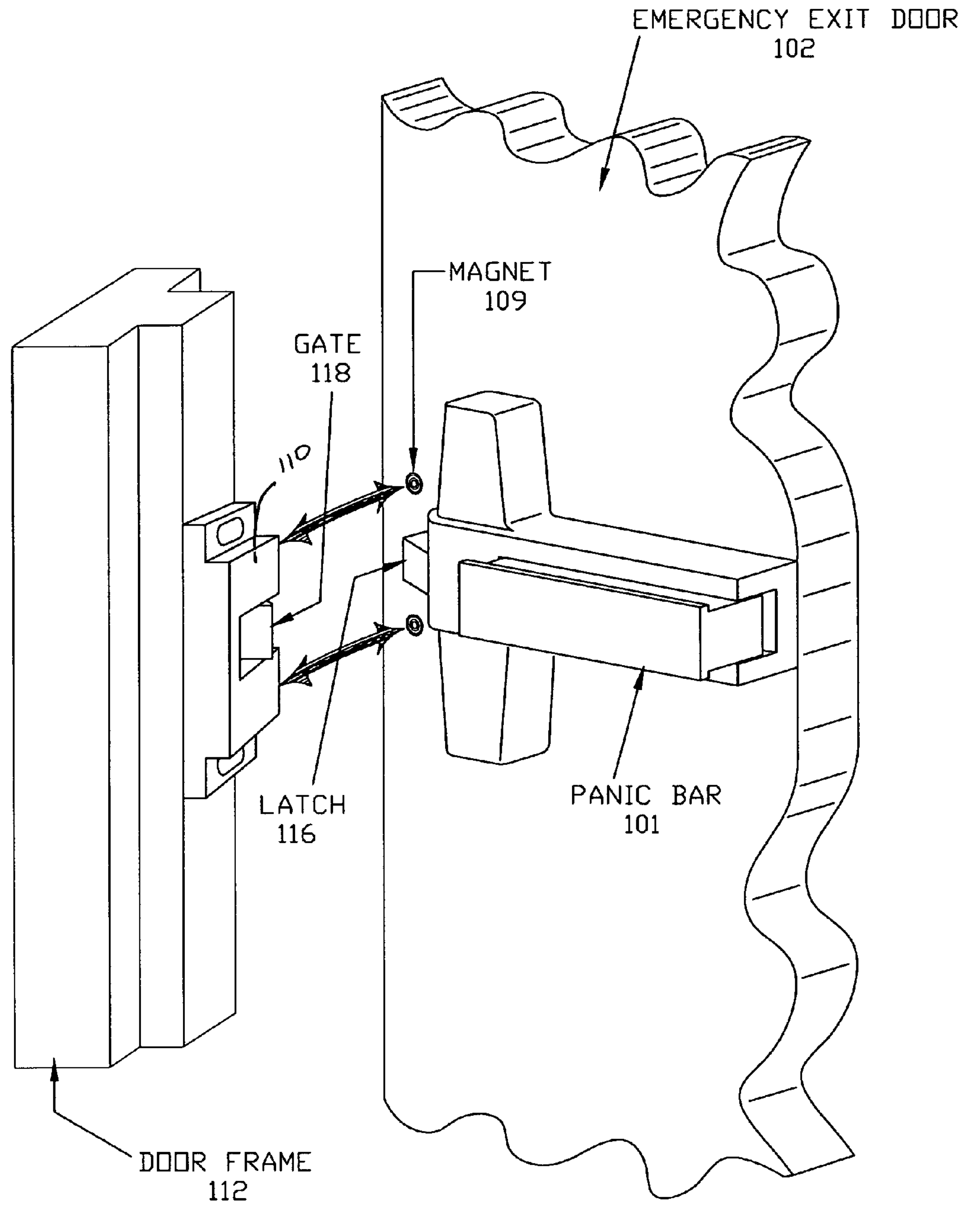
FIG. 5 shows an exploded view of a typical electric door strike and placement of door magnets, in accordance with the instant invention.

Also in a preferred delivery system 5, a providing step may include a substantially inwardly directed force, to maintain the door in a fully closed position, until activated. This force utilizes magnets strategically positioned, connected to and partially embedded in proximity to a door jam, which help to maintain such an inwardly directed force on a metal door, for example (FIG. 5). In addition, this force does not adversely affect the emergency exit door and maintains the door in a properly closed position. More specifically, this structure advantageously helps to eliminate outward force on the door, which could cause the door strike mechanism to be inoperable. When there is a certain threshold outward force, such as an excessive in-building air pressure, or boxes stacked against the door, the solenoid of the electric door strike mechanism may not be strong enough to release the mechanism, causing it to be inoperative. This problem is resolved by the use of the providing step as detailed herein (FIG. 5).

Figure 11:
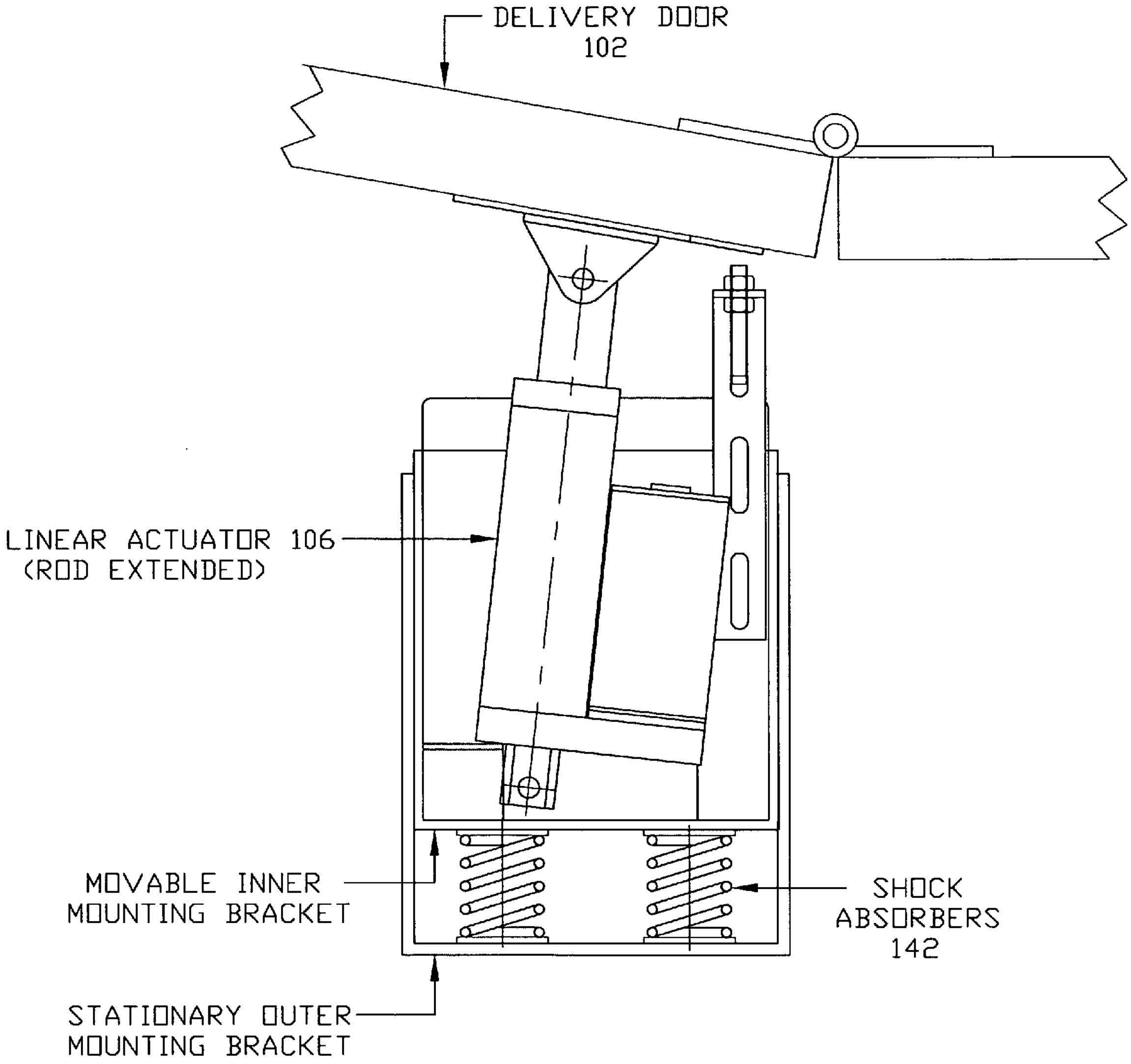
FIG. 11 includes an A-A view of an embodiment as depicted in FIG. 10, with a preferred actuator when the door is in a partially opened position, the door and door opener are shown in contact, and shown with shock absorbing structure, in accordance with the instant invention.
Figure 12:
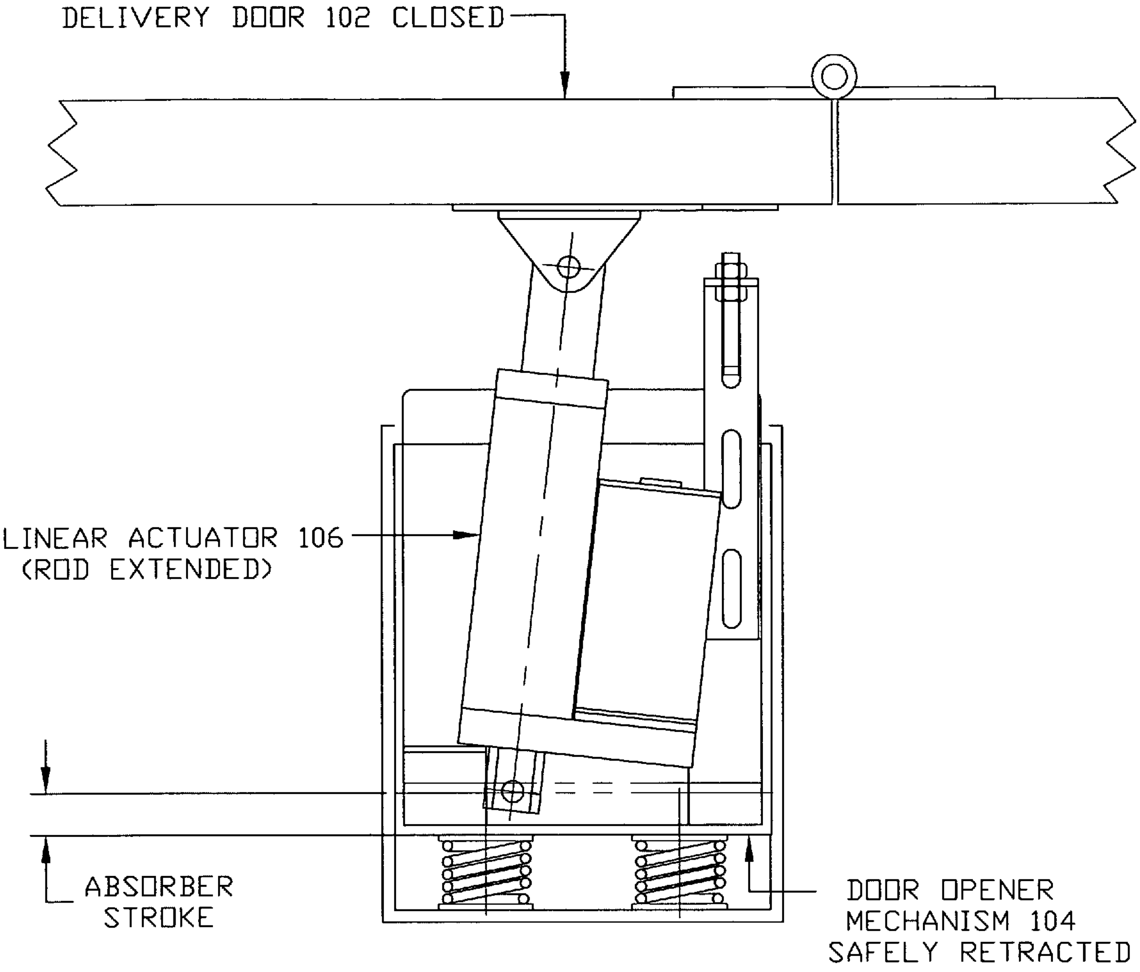
FIG. 12 includes an A-A view of an embodiment as depicted in FIG. 10, with a preferred actuator when the door is in a closed position, the door and door opener are in contact and the latter still extended, and shown with shock absorbing structure, in accordance with the instant invention.

In one embodiment, the system 5 further comprises providing a cushion mechanism to minimize mechanical shock, in the event the door is mechanically shocked, jarred, crashed into, or otherwise hit intentionally or by accident, for example (FIGS. 11 and 12). In an electrical embodiment, as shown in the figures, damage can occur to the actuator if there is an excessive mechanical shock to the door and actuator, in the event that a cushioning mechanism is absent. Similarly, when the actuator is a pneumatic mechanism, the cushioning mechanism is provided by the air pressure in the system, otherwise internal to the mechanism.

Also in one embodiment, the system 5 further comprises positively tracking and time stamping the opening and closing of the door, travel through the opening, logging the duration when open, and management for lighting the desired area. Further, the system 5 can comprise sensing or counting the number of times a person goes through the door opening, which can be desirable for tracking of field and delivery activity. And, the system can comprise providing battery back-up and a charging system for the battery back-up to power the system 5, a security system and independent battery powered lighting, if desired, in certain applications.

In addition, the system 5 can further comprise providing an interface with a security system for providing a fully integrated lock and alarm system.

Referring to FIGS. 2 and 3, in it's simplest form, an emergency exit door delivery management system (DDMS) 100 adapted for use with a conventional emergency exit door 102, is shown. The conventional emergency exit door includes a so called "panic bar" 101, and a door closure mechanism 103, both are preferred or required in one embodiment, for the DDMS 100 to operate properly. The DDMS includes: a door opener mechanism 104 for pushing the emergency exit door 102 open; an electric door strike 110 mountable to a door frame 112 to release the panic bar latch; a controller (or control box) 120 electrically connected to the door opener 104 and the door strike 110; an activation device, such as a keypad 128 or an RF key fob 126; and optionally a motion sensor 132. Advantageously, this system and structure enables the system as detailed in FIGS. 1 and 2. Advantageously, the system 5 and DDMS 100 are cost effective and retrofitable systems which can be adapted for use in already installed sites and applications.

In a preferred embodiment, the control box 120 includes: a backup battery, a wiring harness with appropriate connectors, and a controller board with a microcontroller, memory, real-time clock, power supply, backup battery charging circuit, AID converter to measure system voltages, temperature sensor, input and output interfaces, a communication interface (such as an RS-232), an RF keyfob signal receiver with an internal or external antenna, door opener mechanism power driver circuit, and a keypad interface.

All drawings described below, are shown in connection with an emergency exit door with hinges on the right side. As will be appreciated by those skilled in art, the DDMS 100 could also be used with the door having hinges on the left side and with various pivot enabling door structure, for example, and with other changes and modifications, while staying within the scope of the instant teachings.

Figure 4:
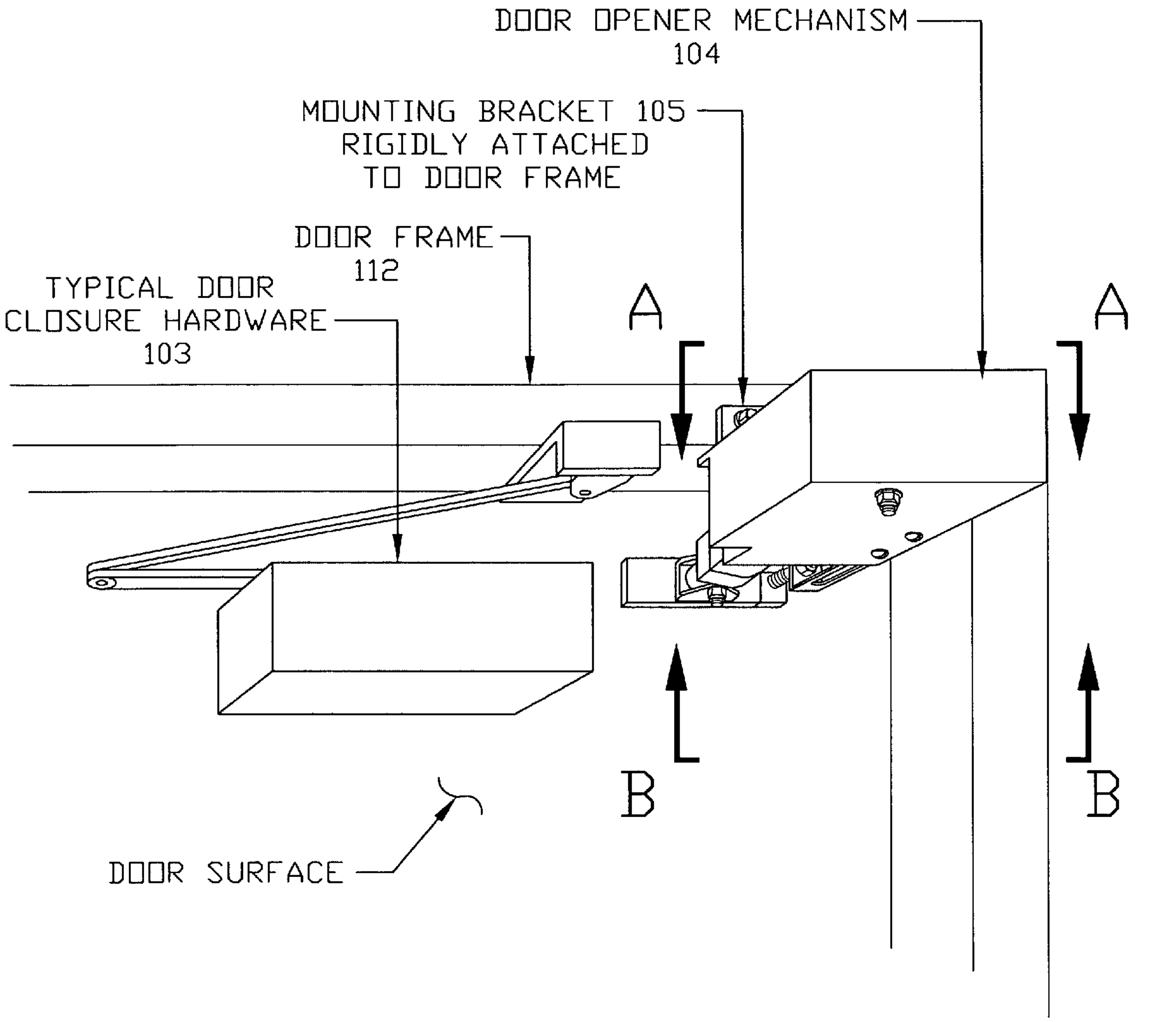
FIG. 4 includes an exploded view of an embodiment with a preferred placement of the door opener mechanism, in accordance with the instant invention.

FIG. 4 shows a view of the top corner near the hinges of the emergency exit door 102. This figure also indicates the locations of two closer views: A-A and B-B used in later figures. The door opener mechanism 104 is firmly mounted to the emergency exit door frame 112 using a steel or thick aluminum bracket 105. The bracket 105 needs to be able to support the door opener mechanism 104 during the door opening operation, and sustain any potential abuse. The door closure 103 provides continuous force to keep the emergency exit door 102 closed and is essential for the DDMS 100 to work, since the door opener mechanism 104 is not attached in any way to the door 102, and it provides an opening force only (in a preferred embodiment). This opening force needs to overcome the closing force from the door closure 103, and also magnetic force provided by magnets 109 near the electric strike, as shown in FIG. 5.

FIG. 5 represents a part of the emergency exit door 102 near the panic bar 101 with a latch 116, and a door frame mounted electric strike 110 with a gate 118 controlled by an internal solenoid. There are two magnets 109 mounted on the door near the strike 110 to provide an additional force to keep the door tightly closed and make sure that the panic bar latch 116 is not touching the strike electric gate 118 when it needs to be energized to release the latch 116 during the opening process. As an alternative, the magnets 109 could be mounted on the door frame 112 near the strike 110. If either: the emergency exit door 102, or the door frame 112 are not made of steel, a small steel plate mounted on the opposite side is preferably provided for the magnets 109 to work properly with the door, as detailed herein.

FIG. 6 to 16 show the A-A views of the door opening mechanism using an electric actuator, which is not attached in any way to the emergency exit door. A typical opening mechanism 104 assembly contains: a linear actuator (preferably either electric or pneumatic) with an interface adapter 136 to push the door open when the actuator is energized, a door position sensor 130, a bracket to attach the assembly to the door frame, an assembly cover, and in the case of a pneumatic system, it may also contain an air compressor, a pressure regulator, air valves, filters, and air hoses. As an alternative, the pneumatic devices supporting the air cylinder actuator, could be mounted in a separate box, or even in the control box 120 together with the system electronics. In one embodiment, shown in FIG. 6, the linear actuator interface adapter may contain a force alignment shoe 134 attached to the movable distal arm 108, and the door may be configured with a slider pad 136, made out of Teflon, or a similar material. Another embodiment is provided in FIG. 13, where a force centering roller 144 and a specially shaped, complementarily configured, force centering adapter 146, attached to the door, are used to interface the linear actuator 106.

FIG. 6 shows the door 102 in the closed position and the linear actuator 106 with the distal arm 108 retracted. When a delivery or service is initiated, a delivery or field worker sends or initiates a request to open the emergency exit door 102, by either pressing the RF key fob 126 button, or punching a code on the keypad 128. The RF key fob signal is received through the antenna 124 and the RF receiver inside the box (FIG. 2). At this time, the controller may disable the alarm, turn the lights on, enable motion sensor 132, if those options are selected. It will energize the electric strike 110 to release the panic bar latch 116, and a fraction of a second later it will activate the linear actuator 106. If the pneumatic system is used, the controller may need to turn the air compressor on and open the air valve to let the air enter the air cylinder. The linear actuator 106 extends the movable distal arm 108, which forces the door 102 to open, is shown in FIG. 7. The length of the movable distal arm 106 determines the opening angle of the door 102. The angle could be as small as 15 deg, or as large as 90 deg. Since the door is not attached to the movable distal arm 106, it could be pulled out and kept open, as desired by the user (FIG. 8). In a preferred embodiment, after a predetermined time, the movable distal arm 106 retracts back. In the case of the pneumatic system, after a predetermined time, the air pressure is released from the air cylinder, and the pressure release valve is kept open until the door 102 is fully closed.

Figure 9:
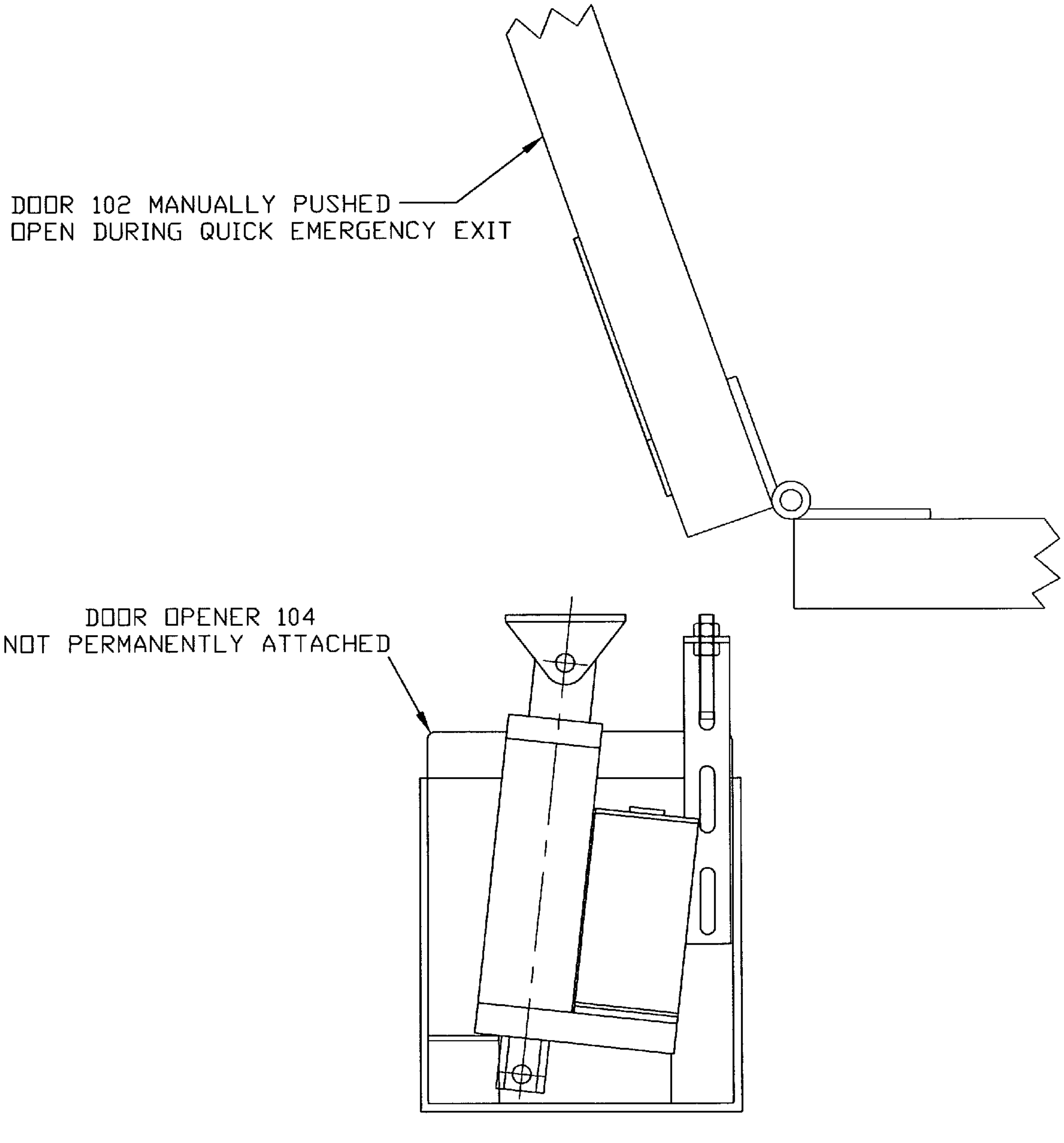
FIG. 9 includes an A-A view of an embodiment as depicted in FIG. 4, with a preferred actuator when the door is opened by a person using an emergency exit, and the door and door opener are substantially shown not in permanent contact, in accordance with the instant invention.

FIG. 9 shows that the emergency exit door 102 can always be opened manually, no matter what the position of the door opener mechanism is.

Figure 10:
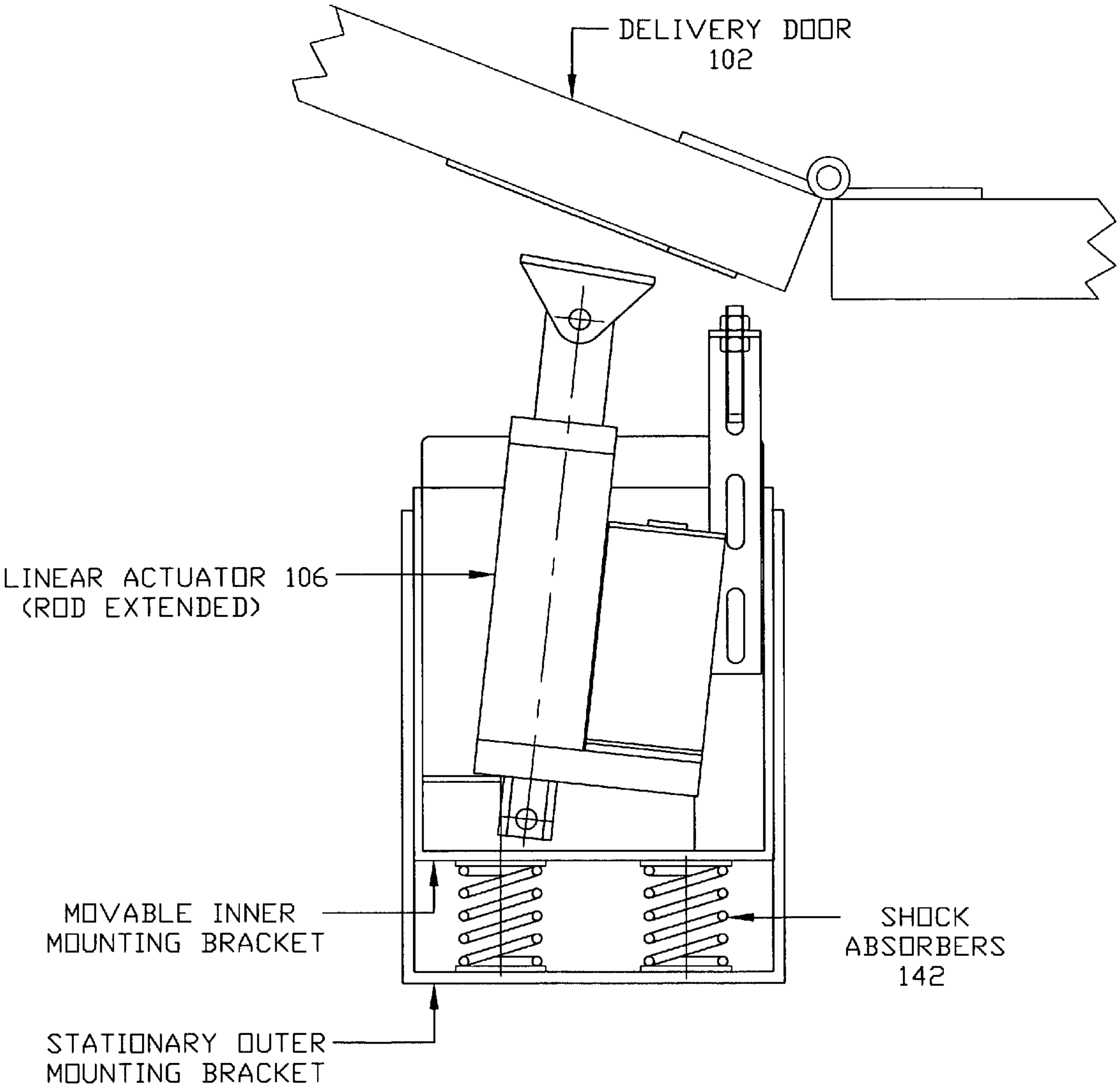
FIG. 10 includes an A-A view of an embodiment as depicted in FIG. 4, with a preferred actuator when the door is in a partially opened position, the door and door opener are substantially shown not in permanent contact, and shown with shock absorbing structure, in accordance with the instant invention.

FIG. 10 shows optional spring shock absorbers 142 to the door opener mechanism 104. This option will protect the linear actuator 106 from damage in case there is an obstruction behind the door, or if the operator hits the door 102 with a delivery cart, while the movable distal arm 108 is still in the extended position. FIGS. 11 and 12 show the possible scenario, when the door 102 is being open and then forcefully closed with the distal arm 108 still extended, and the shock absorbers 142 protecting the linear actuator 106 from damage.

If the door 102 needs to be open to 45 deg or more, a preferred embodiment includes use of the force centering roller 144 and the force centering adapter 146, as described previously (FIG. 13).

FIGS. 13, 14, 15, and 16 show a typical DDMS operation with movable distal arm 106 in various positions. In a preferred embodiment, the distal arm 106 moves to the fully retracted position after a predetermined time (FIG. 15), and the door 102 can still be kept open.

Figure 17:
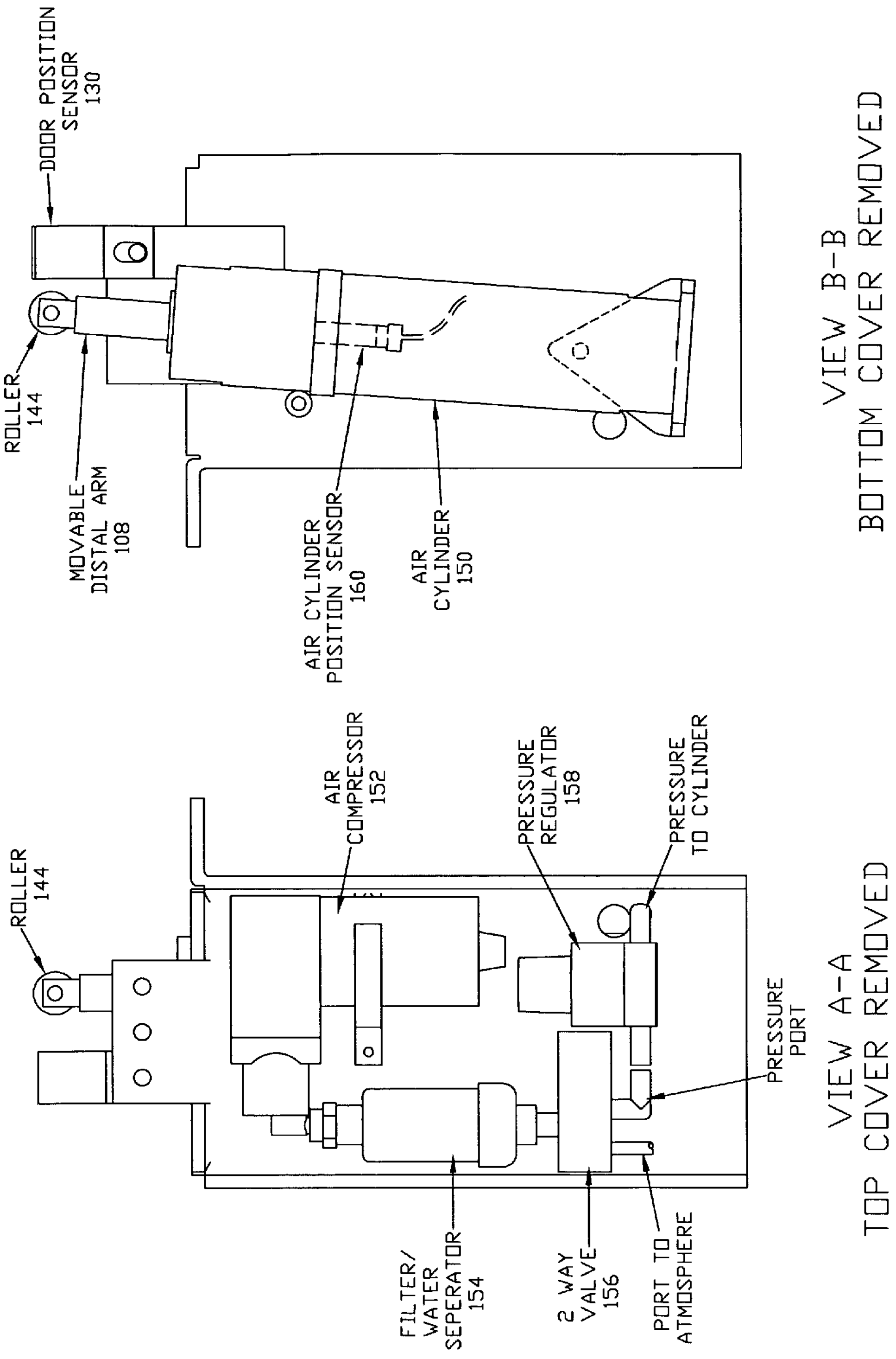
FIG. 17 includes an A-A and B-B views of a preferred embodiment as depicted in FIG. 4, when the actuator is a pneumatic device, in accordance with the instant invention.

The pneumatic version of the door opening mechanism 104 is presented in FIG. 17. It contains: an air compressor 152 to provide compressed air during the door opening process, a filter/water separator 154 to remove any moisture from the compressed air, a 2-way valve 156, with its normally open port used for the compressed air to pass to a pressure regulator 158 which limits the air pressure to maximum set by the regulator dial, and an air cylinder 150 used as a linear actuator (View B-B). A door position sensor 130 is used to determine if the door 102 is closed, and an air cylinder position sensor 160 is used to determine when the door is open, as required by the system—a locator band with the sensor 160 is adjustable to set the maximum opening angle. The electronic controller 120 turns the compressor 152 on for the time needed to open the door, or until the internal preset time expires. The system could be setup to have the door 102 partially, or fully open during this process. The door 102 will close automatically after certain amount of time, determined by another internal timer. This time could be as long as, for example, 30, 60 or 90 seconds, or any other time determined by the user. The door 102 may also become closed by the operator sending a close door request. In one embodiment, the close door request signal may be sent by pressing an RF key fob button. When the close door request is provided, the electronic controller activates the 2-way pressure relief valve 156 with the normally closed port open to atmosphere. This activation releases the air pressure from the air cylinder 150. Closing of the door 102 in the DDMS 100 always requires the closure 103 to move the door 102 to the closed position. If there is a restriction preventing the door 102 to reach its closed position, the controller 120 will maintain the 2-way pressure relief valve 156 energized to continue bleeding the air from the air cylinder 150, until the door 102 is closed. Door closing requests initiated by the user, deactivates the DDMS 100, and the open pressure relief valve 156, until the door 102 is closed.

If the actuator 106 fails to open the door 102 within a given time, it is possible to send another opening request and the DDMS 100 will try to correct the problem. It is desirable for the user, however, to verify the reason of the opening failure. Once the actuator position sensor detects the distal arm fully extended, the further opening requests are not allowed.

The controller 120 includes memory to record the time and duration of when the door has been opened. This is beneficial, as this provides the time of the delivery and duration, to track field personnel efficiency, time stamping if an incident occurs, etc. Likewise, the DDMS 100 can further comprise a motion sensor 132, as shown in FIG. 2, for tracking field and delivery activity through a door opening of the emergency exit door 102.

In another embodiment, the controller 120 controls a charging of a system backup battery, if the main power source voltage meets an appropriate threshold. If there is a power outage, for example, the DDMS 100 would still operate, and deliveries would then not be interrupted or delayed in such instances.

The DDMS 100 can be integrated with an alarm system coupled to the controller 120, for enhanced security.

Those skilled in the art will recognize that a wide variety of modifications, alterations and combinations can be made with respect to the above described embodiments and system, without departing from the spirit and scope of the invention, and that such modifications are to be viewed as being within the ambit of this invention.

The invention claimed is:

1. A delivery system, comprising the steps of:
assigning field personnel to provide a delivery or service at a designated location;
traveling to the designated location to provide an on-site delivery or service;
remotely actuating an opening mechanism to open an emergency exit door, by receiving an opening request from an RF key fob;
configuring the opening mechanism such that the opening mechanism is substantially free from being in permanent contact with the emergency exit door, the opening mechanism including a stationary actuator with a movable distal arm for pushing the emergency exit door open, the movable distal arm being substantially free from being in permanent contact with the emergency exit door;
entering the designated location through the emergency exit door opening, after the remote actuating step;
providing a delivery or service at the designated location; and
closing the emergency exit door after the delivery or service has been substantially completed.

2. The delivery system of claim 1, wherein the remotely actuating step includes applying a sufficient threshold force in a substantially outwardly direction and substantially perpendicular direction to the emergency exit door, to open the door.

3. The delivery system of claim 2, wherein the applying a sufficient threshold force step includes providing a force of at least about 20 lbs.

4. The delivery system of claim 1, wherein the remotely actuating step includes:
applying a sufficient threshold force in a substantially outwardly direction and substantially perpendicular direction to the emergency exit door of at least 25 lbs. to about 300 lbs. or more, when applied in proximity to a hinge; and
providing the threshold force in the substantially perpendicular direction ranging from zero degrees to about 30 degrees from the perpendicular direction; and
minimizing a side load to an actuator.

5. The delivery system of claim 1, wherein the remotely actuating step includes applying a sufficient threshold force in a substantially outwardly direction and in a substantially perpendicular direction to the emergency exit door, providing the threshold force in the substantially perpendicular direction ranging from about zero degrees to about 20 degrees from the perpendicular direction.

6. A delivery system, comprising the steps of:
assigning field personnel to provide a delivery or service at a designated location;
traveling to the designated location to provide an on-site delivery or service;
providing an inwardly directed force to maintain the door in a closed position, until activated;
remotely actuating an opening mechanism to open an emergency exit door, by receiving an opening request from an RF key fob;
activating a door strike mechanism to release a pivoting mechanism of the door strike mechanism;
configuring the opening mechanism such that the opening mechanism is substantially free from being in permanent contact with the emergency exit door, the opening mechanism including a stationary actuator with a movable distal arm for pushing the emergency exit door open, the movable distal arm being substantially free from being in permanent contact with the emergency exit door;

providing a delivery or service at the designated location; and closing the emergency exit door after the delivery or service has been substantially completed.

7. The delivery system of claim 6, wherein the remotely actuating step includes applying a sufficient threshold force in an outwardly direction and in a substantially perpendicular direction to the emergency exit door includes:

applying a substantially outwardly pushing force; and locating the outwardly pushing force at a location and position which is substantially minimally invasive to the emergency exit door opening.

8. The delivery system of claim 7, wherein the locating step includes positioning the pushing force in proximity to an upper corner of the emergency exit door near a side of the door where hinges are located.

9. The delivery system of claim 6, wherein the remotely actuating step includes:

applying a sufficient threshold force in an outwardly direction and in a substantially perpendicular direction to the emergency exit door; and providing an opening mechanism which is substantially free of being mechanically connected to the emergency exit door.

10. The delivery system of claim 9, wherein the providing step includes:

providing a plunging mechanism to contact the emergency exit door to push in a substantially outwardly direction; and providing a receiving interface for contacting the plunging mechanism, operatively connected to an inside of the emergency exit door.

11. The delivery system of claim 10, wherein the interface includes a substantially concave cup constructed to receive a portion of a roller of the actuator.

12. The delivery system of claim 6, wherein the remotely actuating step includes a wired device or a wireless device for actuation.

13. The delivery system of claim 6, wherein the actuating step further includes:

activating a door strike mechanism remotely by triggering an RF communication signal to release a pivoting mechanism of the door strike mechanism, to allow the door to open; and pushing the door in an outwardly direction.

14. A delivery system, comprising the steps of:

assigning field personnel to provide a delivery or service at a designated location;

traveling to the designated location to provide an on-site delivery or service;

providing an inwardly directed force to maintain the door in a closed position, until activated;

remotely actuating an opening mechanism to open an emergency exit door by receiving an opening request from an RF key fob;

activating a door strike mechanism to release a pivoting mechanism of the door strike mechanism;

configuring the opening mechanism such that the opening mechanism is substantially free from being in permanent contact with the emergency exit door, the opening mechanism including a stationary actuator with a movable distal arm for pushing the emergency exit door open, the movable distal arm being substantially free from being in permanent contact with the emergency exit door;

providing a delivery or service at the designated location; and enabling the emergency exit door to close and lock after the delivery or service has been substantially completed.

15. The delivery system of claim 14, further comprising providing a cushion mechanism to minimize mechanical shock.

16. The delivery system of claim 14, further comprising positively tracking open and closing of the door and logging the duration when open and providing lighting management while open.

17. The delivery system of claim 14, further comprising sensing or counting the number of times a person goes through the door opening.

18. The delivery system of claim 14, further comprising providing battery back-up and charging system for the battery back-up.

19. The delivery system of claim 14, further comprising providing an interface with a security system.

20. The delivery system of claim 14, wherein the remotely actuating step includes providing an RF key fob with at least one of an open signal, an alarm disable signal, a re-activate alarm signal and a panic signal.

21. The delivery system of claim 14, further comprising a management system to be able to positively identify each opening request, determine whether it is allowed to open the door at the given time, perform the allowed opening request, and store the request information in the internal event memory, to be retrieved later by a system administrator.

* * * * *